US008976420B2

(12) United States Patent
Steidl

(10) Patent No.: US 8,976,420 B2
(45) Date of Patent: Mar. 10, 2015

(54) METHOD AND DEVICE FOR PROCESSING VALUE DOCUMENTS

(75) Inventor: Helmut Steidl, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 979 days.

(21) Appl. No.: 13/124,462

(22) PCT Filed: Oct. 12, 2009

(86) PCT No.: PCT/EP2009/007316
§ 371 (c)(1), (2), (4) Date: Apr. 15, 2011

(87) PCT Pub. No.: WO2010/043358
PCT Pub. Date: Apr. 22, 2010

(65) Prior Publication Data

US 2011/0199649 A1 Aug. 18, 2011

(30) Foreign Application Priority Data

Oct. 15, 2008 (DE) ........................ 10 2008 051 758

(51) Int. Cl.
*H04N 1/00* (2006.01)
*G07D 7/16* (2006.01)
*B65H 7/06* (2006.01)

(52) U.S. Cl.
CPC .................. *G07D 7/168* (2013.01); *B65H 7/06* (2013.01); *B65H 2511/16* (2013.01); *B65H 2511/413* (2013.01); *B65H 2511/522* (2013.01); *B65H 2513/41* (2013.01); *B65H 2513/42* (2013.01); *B65H 2553/42* (2013.01);
(Continued)

(58) Field of Classification Search
USPC .......... 358/406, 449, 462, 463, 464; 700/224; 283/114; 235/379, 487
See application file for complete search history.

(56) References Cited

U.S. PATENT DOCUMENTS 4,623,975 A 11/1986 Kagami
5,680,472 A 10/1997 Conant (Continued)

FOREIGN PATENT DOCUMENTS

EP 0766208 A1 4/1997
EP 0802510 A2 10/1997

(Continued)

OTHER PUBLICATIONS

Search Report of German PTO regarding German Patent Application No. 10 2008 051 758.5, Oct. 28, 2009.

(Continued)

*Primary Examiner* — Allen H Nguyen
(74) *Attorney, Agent, or Firm* — Workman Nydegger

(57) ABSTRACT

The invention relates to an apparatus and a method for processing value documents. A value document is input to the input opening of an apparatus for value-document processing and transported using a transport system of the apparatus to an image sensor which senses a partial image of the value document. A contour of the front partial area is ascertained from the sensed partial image and checked. If the check of the contour of the front partial area yields a fault, the value document is rejected. Faulty or faultily transported value documents can thus be recognized and transported back to the input opening at a very early time.

10 Claims, 2 Drawing Sheets

(52) U.S. Cl.
CPC .................. *B65H 2701/1311* (2013.01); *B65H 2701/1912* (2013.01); *G07D 7/162* (2013.01); *G07D 7/166* (2013.01)
USPC ............ 358/406; 358/449; 235/379; 235/487

(56) References Cited

U.S. PATENT DOCUMENTS

| | | | | |
|---|---|---|---|---|
| 6,318,714 | B1 * | 11/2001 | Beskitt et al. | 271/10.01 |
| 6,530,602 | B1 * | 3/2003 | Stenzel et al. | 283/114 |
| 2003/0030785 | A1 | 2/2003 | Christophersen | |
| 2006/0103890 | A1 * | 5/2006 | Hsu | 358/449 |
| 2007/0194106 | A1 * | 8/2007 | Force et al. | 235/379 |
| 2008/0069425 | A1 * | 3/2008 | Liu et al. | 382/137 |
| 2008/0122166 | A1 * | 5/2008 | Fukube | 271/265.01 |
| 2008/0177420 | A1 * | 7/2008 | Klein et al. | 700/224 |
| 2008/0210605 | A1 * | 9/2008 | Park et al. | 209/534 |
| 2008/0273789 | A1 | 11/2008 | Bell et al. | |
| 2009/0038909 | A1 * | 2/2009 | Stapfer | 194/206 |
| 2009/0146370 | A1 * | 6/2009 | Kao | 271/227 |
| 2010/0128934 | A1 * | 5/2010 | Su et al. | 382/112 |

FOREIGN PATENT DOCUMENTS

| | | | |
|---|---|---|---|
| EP | 1739634 | A1 | 1/2007 |
| WO | 0154078 | | 7/2001 |
| WO | 2006064008 | | 6/2006 |
| WO | 2009116374 | | 9/2009 |

OTHER PUBLICATIONS

International Search Report in PCT/EP2009/007316, Feb. 15, 2010.

* cited by examiner

METHOD AND DEVICE FOR PROCESSING VALUE DOCUMENTS

BACKGROUND OF THE INVENTION

1. Field of the Invention

This invention relates to a method and an apparatus for processing value documents, in particular bank notes, cards, checks, tickets, vouchers, etc.

2. Related Art

For paying bank notes into a bank-note processing machine, the bank notes can be individually input successively through an input opening of the machine. The input bank notes are automatically taken up by a transport system and supplied to processing in the machine. In the bank-note processing machine there is effected a check and recognition of the bank notes using sensors, thereby ascertaining e.g. the authenticity, the type (currency, denomination) or the state (soiling, damage) of the bank notes. On the basis of the results of the check and recognition, the bank notes are sorted and stored in the apparatus or else returned.

For the processing of bank notes in a bank-note processing machine it is of fundamental importance that the bank notes are input to the machine individually and correctly. Faultily transported bank notes pose problems upon further processing, because they can lead to jamming in the transport system or not be recognized and checked by the sensors. For example, it can lead to transport problems when folded bank notes or bank notes with large dog's-ears are input to the input pocket. Transport problems also occur if foreign bodies or several value documents at the same time are input or if the bank notes are input too close to the edge of the input opening or too obliquely.

In the past there have been proposed a multiplicity of improvements intended to improve the quality of the bank-note feed and to ensure that only one bank note at a time passes into the machine and does so straight. For this purpose there have been proposed for example mechanical improvements. Likewise, it has been proposed to provide light barriers after the input opening of the machine to ascertain whether a bank note is being input to the machine too obliquely.

Starting out from the stated prior art, the invention is based on the object of stating a method and an apparatus for processing value documents wherein transport problems are avoided in the bank-note processing machine.

SUMMARY OF THE INVENTION

In the method according to the invention, a value document is input, for example manually or using a singling device, to an input opening of an apparatus for value-document processing in a first step. The value document is transported along a transport direction using a transport system of the apparatus, being transported to an image sensor, e.g. a remission and/or transmission sensor, which senses a partial image of the value document. The image sensor first senses only the partial image of the value document, on which only a front partial area of the value document is imaged, while a back partial area of the value document is not imaged on the partial image. While the value document is being transported past, the image sensor continually senses image lines of the value document, from which lines only the partial image of the value document is first formed, optionally further partial images and, as soon as the value document is completely scanned, an overall image thereof. From the partial image sensed by the image sensor there is ascertained a contour of the front partial area of the value document, whereby the course of a contour line of the front partial area is determined. For ascertaining the contour, the sensed partial image is subjected to an image processing by which the edge of the value document is localized and the coordinates of the contour line are determined. From the ascertained contour of the front partial area of the value document there is determined e.g. the form of the front partial area and/or the orientation, such as an oblique position, of the front partial area within the sensed partial image and/or the position of the front partial area within the sensed partial image and/or the extension of the front partial area. For example, there are determined the position and/or the extension of the front partial area perpendicular to the transport direction of the value document. The extension of the value document perpendicular to the transport direction will hereinafter be designated the width, and the extension parallel to the transport direction the length.

The ascertained contour of the front partial area is subsequently checked for certain contour specifications. The check is carried out for recognizing faulty or faultily transported value documents. It is thereby checked e.g. whether one or several contour properties lie within certain acceptance ranges and/or whether deviations of one or several contour properties from respective target properties are acceptable. Target properties for the contour are e.g. the parallelism of the longitudinal edges of the front partial area, or the vertical alignment of leading edge and longitudinal edges of the front partial area, or the rectangular form of the front partial area, or the straight line form of the edges. Acceptance ranges can be specified e.g. for the width of the front partial area and/or for the distance of the front partial area from the upper and lower edges of the sensed partial image and/or for the oblique position of the front partial area within the sensed partial image and/or for the angles of one or several edges of the front partial area with respect to the transport direction and/or for the position of one or several edges or corners of the front partial area within the sensed partial image. Preferably the check of the ascertained contour involves a check of the form of the front partial area and/or the orientation of the front partial area and/or the position of the front partial area and/or the extension of the front partial area.

If it is recognized upon the check of the contour that the contour does not fulfill at least one of the contour specifications, the further processing of the value document in the apparatus is terminated and the value document is rejected as faulty. The value document is preferably rejected as faulty if the check of the form of the front partial area and/or of the orientation of the front partial area and/or of the position of the front partial area and/or of the extension of the front partial area yields a fault. In particular, the transport of the value document is thereby stopped, the transport direction of the value document reversed, and the value document transported back to the input opening of the apparatus.

Some contour properties can already be reliably checked after sensing of the partial image of a relatively short front partial area, e.g. the position and the width of the front partial area. Other contour properties, such as the angles of the longitudinal edges, can be reliably checked only as of a certain length of the front partial area. Hence, the contour specifications are preferably checked in a certain order. For example, first the position and the width of the front partial area are ascertained, and subsequently the orientation and the form of the front partial area. In a special embodiment, the image sensor successively senses several partial images on which front partial areas of the value document of varying length are imaged. The several partial images respectively consist of a multiplicity of image lines which the image sensor successively senses while the value document is being transported past. Thus, there is first sensed a first partial image on which a relatively short front partial area of the value document is imaged. A second partial image is composed of the first partial image and a few further image lines which were sensed after the image lines of the first partial image. From each of the several front partial areas there is respectively ascertained a contour. Each of the contours of the different front partial areas can be checked for contour specifications. The checked contour specifications of the different front partial areas can relate to the same contour properties or to different contour properties.

The ascertainment of the contour and/or the check of the contour is preferably carried out before the trailing edge of the value document is transported past the image sensor. This makes it possible for the value document to be recognized as faulty at an early time, before it is transported deeper into the interior of the apparatus. Faulty or faultily transported value documents can thus be recognized at a very early time and rejected immediately after inputting. Before the value document has been transported completely past the image sensor, there is generated by an evaluation device, which carries out the check of the contour, a fault signal on the basis of which the value document is rejected.

If it is ascertained upon the check of the contour that the contour of the front partial area fulfills the contour specifications, the sensing of image lines by the image sensor is continued until the latter has sensed an overall image of the value document. The overall image is composed of the sensed partial image and the other image lines which were sensed after the image lines of the partial image, so that the whole value document is imaged on the overall image. The same image sensor is employed for sensing the partial image on which only the front partial area is imaged and for sensing the overall image of the value document which is employed for recognizing the type of the value document and/or the authenticity of the value document. Using the image information of said image sensor, there are thus ascertained both the type of the value document and/or its authenticity, and the contour of the front partial area which is checked for recognizing faulty or faultily transported value documents.

Also, the invention relates to an apparatus for processing value documents. The apparatus can be a self-service terminal, in particular a cash deposit machine, a payment machine, e.g. for goods or services, a vending machine or also a change machine. The apparatus possesses an input opening which is configured for receiving individual value documents successively. The input opening can be configured for manual input of individual value documents successively. Alternatively, the apparatus can also have, before the input opening, a singling device through which individual value documents are singled from a stack of value documents and supplied successively to the input opening. Also, the apparatus has an image sensor as well as a transport system for transporting the input value documents from the input opening to the image sensor along a transport direction. The transport system is preferably configured for also transporting the input value documents back in the opposite direction from the image sensor to the input opening. The image sensor of the apparatus is configured for sensing one or several partial images of a value document input to the apparatus and for sensing an overall image of the input value document. For this purpose, the image sensor senses a multiplicity of image lines from the value document. From a few image lines first sensed there are assembled one or several partial images, from the totality of the sensed image lines, finally, the overall image of the value document. From the partial image or images, the contour of a front partial area of the value document is respectively ascertained and checked for contour specifications. The image sensor is preferably arranged immediately after the input opening, in particular at a distance from the input opening along the transport direction of at most two lengths, preferably of at most one length, of the value documents typically input to the apparatus.

The apparatus also has an evaluation device, which can be configured together with the image sensor in a common housing. The evaluation device can be configured for carrying out the image processing and/or the ascertainment of the contour of the front partial area of the value document and/or the check of the contour. Alternatively or additionally, the apparatus can also have outside the image sensor an evaluation device which can be configured for image processing and/or ascertainment of the contour of the front partial area and/or check of the contour. In one embodiment example, said evaluation device is also configured for controlling the apparatus.

DESCRIPTION OF THE DRAWINGS

Further embodiments and advantages of the invention will hereinafter be explained with reference to the figures and their description.

There are shown.

DESCRIPTION OF REFERRED EMBODIMENTS OF THE INVENTION

Figure 1:
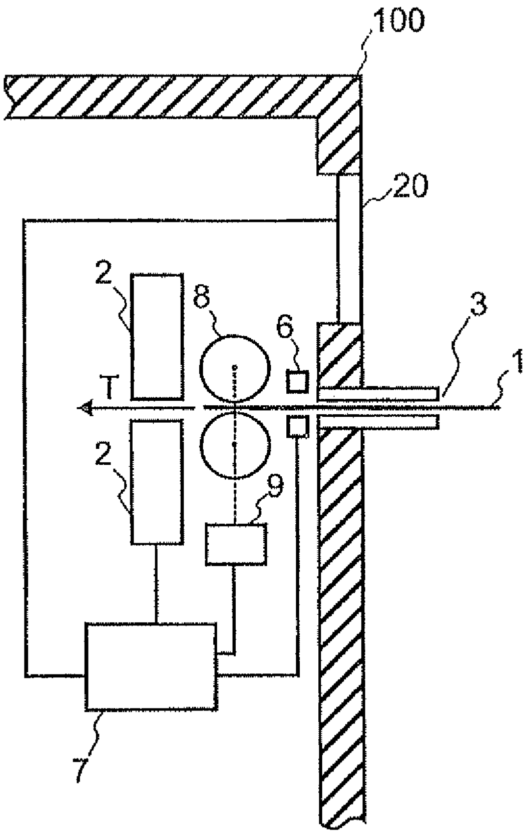
FIG. 1 a detail of an apparatus for value-document processing to which individual value documents are input, FIGS. 2*a-c* the consecutive determination of the contours of three different front partial areas of the same value document, FIGS. 3*a-d* four value documents recognized as faulty and the respective sensed partial image and ascertained contour of a front partial area of the value document.

FIG. 1 shows a detail of an apparatus 100 for value-document processing to which value documents 1, e.g. bank notes, can be individually input successively through the input opening 3. The apparatus 100 can also have input slots for cards, tickets, vouchers or the like and/or an output opening for products or value documents which are stored in the apparatus 100 (not shown). It can also be provided that cards, tickets, vouchers or similar documents are also input through the input opening 3. An operator using the apparatus 100 operates it via the user interface 20, which can be configured e.g. as a touchscreen or as a screen with a keyboard, and inputs a value document 1 to the apparatus 100 through the input opening 3. The apparatus 100 has a light barrier 6 which registers the input value document 1 and sends a corresponding message to the control and evaluation device 7. The latter prompts the transport system of the apparatus 100, in particular the motor 9 driving the transport rollers 8, to trans-port the value document 1 along the transport direction T. Immediately after the input opening 3, in this example less than one length of the value document 1 along the transport direction T away from the input opening 3, the value document 1 is trans-ported to an image sensor 2. The image sensor 2 can have a line sensor, e.g. on a CCD or CMOS basis, with which the value document 1 is scanned line by line.

Figure 2A:
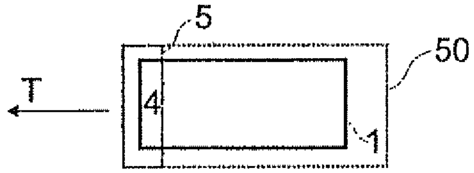

Prompted by a start signal which the control and evaluation device 7 sends to the image sensor 2, the image sensor 2 starts to continuously record image lines in order to sense an overall image 50 of the value document 1. After a defined time span, the image sensor 2 has sensed a partial image 5 from the value document 1 partly transported past, cf. FIG. 2*a*. On the partial image 5 there is imaged a front partial area 4 of the value document 1, said partial area consisting of the leading edge of the value document 1 and a front section of the value document 1 which is transported past the image sensor 2 first. The length of the front partial area 4 corresponds to a defined time span which is chosen in dependence on the transport speed of the value document 1. Typically, the length of the front partial area 4, viewed in the transport direction T, amounts to 1-10 cm.

The partial image 5 sensed by the image sensor 2 is subjected to an image processing, which can take place in the image sensor 2 itself and/or in the control and evaluation device 7. From the partial image 5 a contour of the front partial area 4 of the value document 1 is determined using the image processing, cf. FIG. 2*a*. Said contour is checked for certain contour specifications by the control and evaluation device 7. According to the invention, the value document 1 is processed further in the apparatus 100 only when the front partial area 4 fulfills the contour specifications.

For further processing in the apparatus 100, the value document 1 is trans-ported further along the transport direction T. As soon as the value document 1 has been transported completely past the image sensor 2, the image sensor 2 has sensed an overall image 50 of the value document 1, cf. FIG. 2*a*. The sensed overall image 50 is employed for determining the type of the value document 1 and for checking the value document 1 for authenticity. After recognition of the value document 1 and a positive authenticity check, the value document 1 is stored in a value-document store of the apparatus 100 (not shown).

If the contour of the front partial area 4 determined by the image processing does not fulfill the contour specifications, the further processing of the value document in the apparatus 100 is terminated. By a corresponding signal, which the control and evaluation device 7 sends to the transport system, e.g. to the motor 9, the transport of the value document 1 is stopped before the value document is transported completely past the image sensor 2. The transport system subsequently reverses the transport direction of the value document 1, so that the value document 1 is transported back to the input opening 3 of the apparatus 100 and thus returned to the operator of the apparatus 100. Simultaneously or immediately after the value document 1 is transported back to the input opening 3, a message about the return of the value document 1 can be displayed on the user interface 20, notifying the operator e.g. of the return itself and/or of the reason for the return.

Figure 2B:
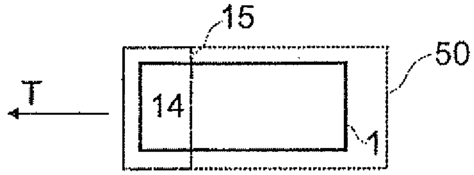
Figure 2C:
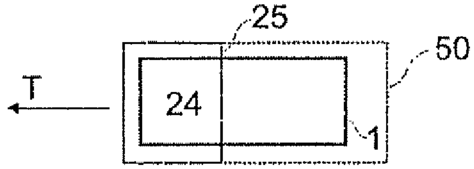

From the value document 1 the image sensor 2 can sense exactly one partial image 5, from which there is determined the contour of exactly one front partial area 4 which is subsequently checked for contour specifications. Alternatively, the image sensor 2 can also sense from the value document 1 several partial images 5, 15, 25, from which a contour of a front partial area 4, 14, 24 is respectively determined successively using the image processing, cf. FIGS. 2*a-c*. From a first partial image 5 which contains only the leading edge and a short front portion of the value document 1, there can be ascertained the contour of a first front partial area 4, which is checked immediately for contour specifications, such as for the position and/or width of the first front partial area 4. In this manner it is possible to already recognize a faulty position and/or width of the front partial area 4 or of the value document 1 and reject the value document 1 at an early time after the onset of image sensing. For assessing the orientation, e.g. oblique position, and form of the value document 1 there are additionally utilized the orientation and form of further front partial areas 14 and 24 which respectively contain a larger section of the value document 1.

Figure 3A:
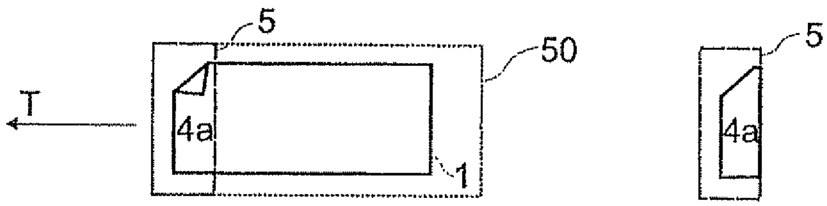
Figure 3B:
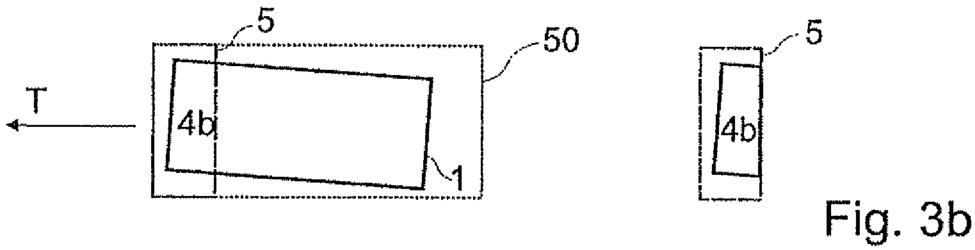
Figure 3C:
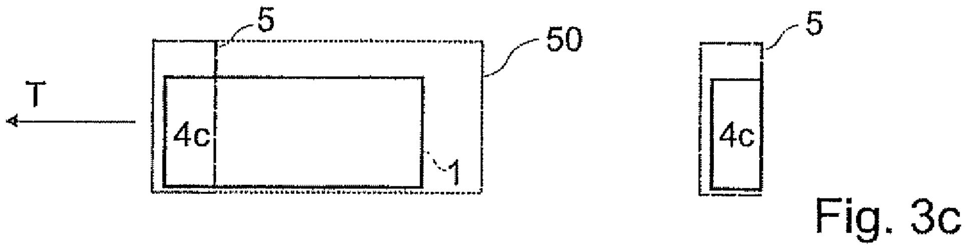
Figure 3D:
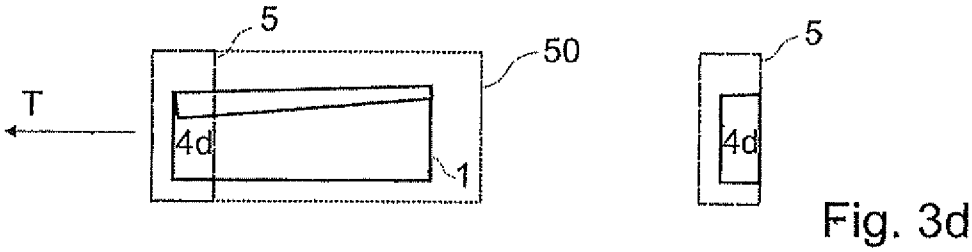

In FIGS. 3*a-d* there are depicted by way of example four different value documents 1 which are recognized as faulty by the apparatus 100. FIG. 3*a* shows a value document 1 with a large dog's-ear, FIG. 3*b* a value document 1 with a considerably oblique position, FIG. 3*c* a value document 1 whose position is close to the lower edge of the sensed partial image 5, FIG. 3*d* a value document 1 folded in the longitudinal direction. On the left side of FIGS. 3*a-d* there are shown the partial images 5 respectively sensed by the image sensor 2. On the right side there is respectively shown the contour of the front partial area 4*a-d* of the value document 1 which was ascertained from the respective partial image 5. For example, the following contour properties of the front partial areas 4*a-d* are checked:

a) The front partial areas 4*a-d* of the value documents 1 are ideally rectangular. It is checked e.g. how big the deviation of the form of the front partial areas 4*a-d* from a rectangular form is, and whether the size of the deviation is acceptable. The form of the front partial areas 4*a-d* can deviate from the rectangular form e.g. due to dog's-ears, tears or torn-off pieces of the value document 1. Small deviations from the rectangular form can be tolerated, however. The front partial area 4*a* of the value document 1 from FIG. 3*a* has a form lying outside the relevant acceptance range on account of the large dog's-ear.

b) The value documents 1 are ideally input to the input opening 3 straight, so that their longitudinal edges extend parallel to the transport direction T. Hence, the front partial areas 4*a-d* are also checked for their orientation, i.e. for a possibly oblique position. For this purpose, e.g. the course of the longitudinal edges and/or the leading edge of the value document 1 is determined from the respectively ascertained contour, and the angles that the longitudinal edges and/or the leading edge of the value document 1 enclose with the line direction of the image sensor 2 or with the transport direction T are checked. If a value document 1 is input too obliquely, cf. FIG. 3*b*, at least one of the stated angles of the front partial area 4*b* will lie outside a relevant acceptance range.

c) The value documents 1 should be input to the input opening 3 centrally. Viewed perpendicular to the transport direction, the middle of the front partial areas 4*a-d* lies e.g. ideally in the middle of the sensed partial images 5. From the ascertained contour there are determined e.g. the distances of the front partial areas 4*a-d* from the upper or lower edge of the respective partial image 5. If a value document 1 is input to the input opening 3 too close to the edge, cf. FIG. 3*c*, the distance of the front partial area 4*c* from the lower edge of the partial image 5 will lie outside the relevant acceptance range.

d) From the information about which types of value documents 1 can be input to the apparatus 100 there is defined an acceptance range for the extension of the front partial area 4 perpendicular to the transport direction T, i.e. an acceptance range for the width of the front partial area 4. From the ascertained contour the width of the front partial areas 4*a-d* is respectively determined and it is checked whether the width lies within the relevant acceptance range. A value document 1 folded strongly in the longitudinal direction, cf. FIG. 3*d*, possesses a smaller width, so that the extension of the front partial area 4*c* lies outside the relevant acceptance range.

Besides these examples it is also possible, through the check of the contour of the respective front partial area 4, for foreign objects which are input to the input opening 3, or also several, shingled value documents 1 which are input to the input opening 3 simultaneously, to be recognized and returned to the operator at an early time.

The acceptance ranges and the tolerable deviations for the different contour properties can be defined prior to the value-document processing, but they can also be defined in dependence on a result of the contour check. The contour of the front partial area 4 can be subjected e.g. to a first check wherein the position and/or the extension of the front partial area 4 are determined. The subsequent check of the orientation or oblique position of the front partial area 4 can then be carried out e.g. in dependence on the previously ascertained position and/or extension of the front partial area 4. For example, a (slightly) oblique position of the front partial area 4 is more likely to be tolerable when the front partial area 4 lies centrally, in the middle of the partial image 5. However, when the front partial area 4 lies close to the edge of the partial image 5 and e.g. its position hence lies just within the acceptance range, and at the same time the (slightly) oblique position makes it probable that the position of the back part of the value document 1 will lie outside the acceptance range, the value document 1 is rejected. If the (slightly) oblique position extends in the other direction, however, this might possibly be accepted. Hence, the acceptance range for the oblique position of the front partial area 4 can be defined e.g. in dependence on the ascertained position of the front partial area 4.

The invention claimed is:

1. A method for processing value documents, comprising the following steps:

inputting a value document to an input opening of an apparatus for value-document processing;

transporting the value document along a transport direction to an image sensor which senses a partial image of the value document;

ascertaining a contour of a front partial area of the value document from the partial image; and checking the contour of the front partial area, wherein if the check of the contour of the front partial area yields no fault, the image sensor senses an overall image of the value document.

2. The method according to claim 1, including determining from the ascertained contour of the front partial area a form of the front partial area and/or an orientation of the front partial area and/or a position of the front partial area and/or an extension of the front partial area.

3. The method according to claim 1, including, in the check of the contour, checking the form of the front partial area and/or the orientation of the front partial area and/or the position of the front partial area and/or the extension of the front partial area.

4. The method according to claim 1, including ascertaining and/or checking of the contour of the front partial area before a trailing edge of the value document is transported past the image sensor.

5. The method according to claim 1, wherein if the check of the contour of the front partial area yields a fault, the value document is rejected.

6. The method according to claim 1, wherein the contours of several front partial areas of the value document are ascertained and checked from several different partial images of the value document.

7. An apparatus for processing value documents comprising:

an input opening that receives individual value documents;

a transport system that transports the value documents along a transport direction;

an image sensor that senses a partial image of a value document input to the apparatus; and an evaluation device which ascertains a contour of a front partial area of the value document from the partial image and checks the contour, wherein if the evaluation of the contour of the front partial area yields no fault, the image sensor senses an overall image of the value document.

8. The apparatus according to claim 7, wherein the evaluation device is arranged to check the form of the front partial area and/or the orientation of the front partial area and/or the position of the front partial area and/or the extension of the front partial area upon the check of the contour.

9. The apparatus according to claim 7, wherein the image sensor is located immediately after the input opening.

10. The apparatus according to claim 7, wherein the transport system is configured to transport the value document back to the input opening.

* * * * *